J. R. RICKETTS.
TROLLEY CATCHER.
APPLICATION FILED APR. 30, 1919.
1,393,570.
Patented Oct. 11, 1921.
2 SHEETS—SHEET 1.
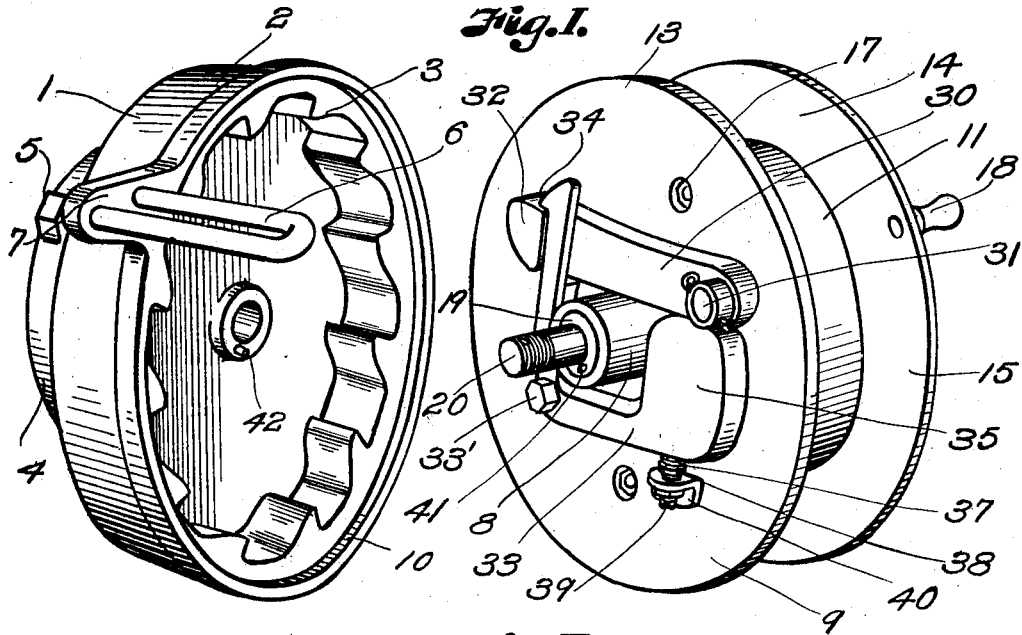
Fig. I.
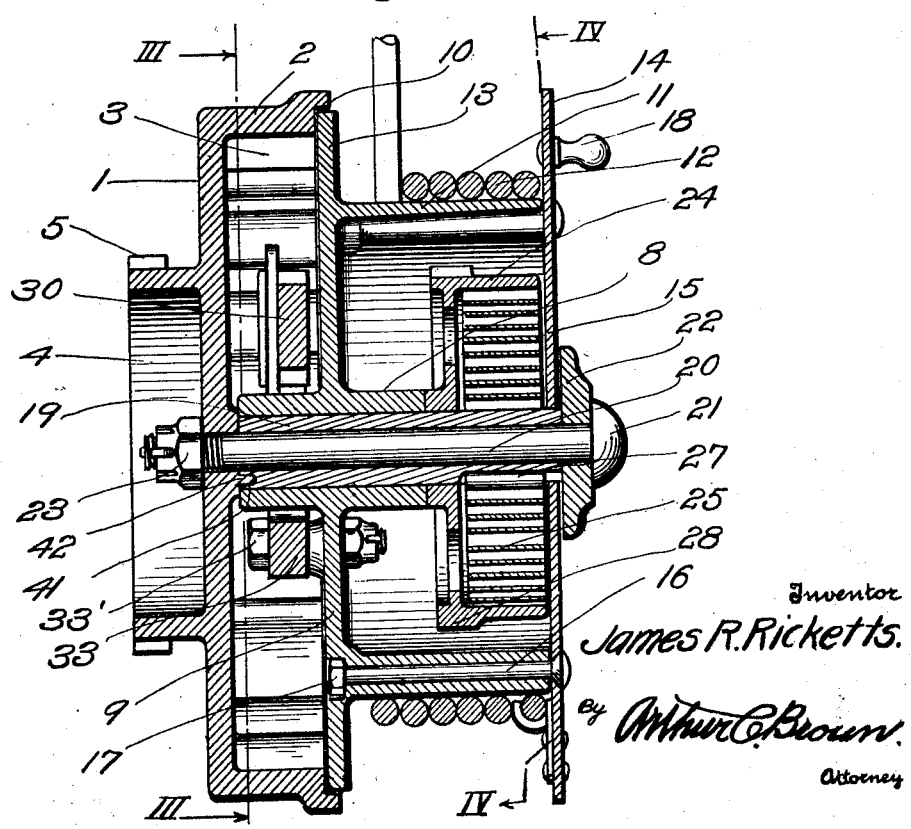
Fig. II.
Inventor
James R. Ricketts.
by Arthur C. Brown.
Attorney

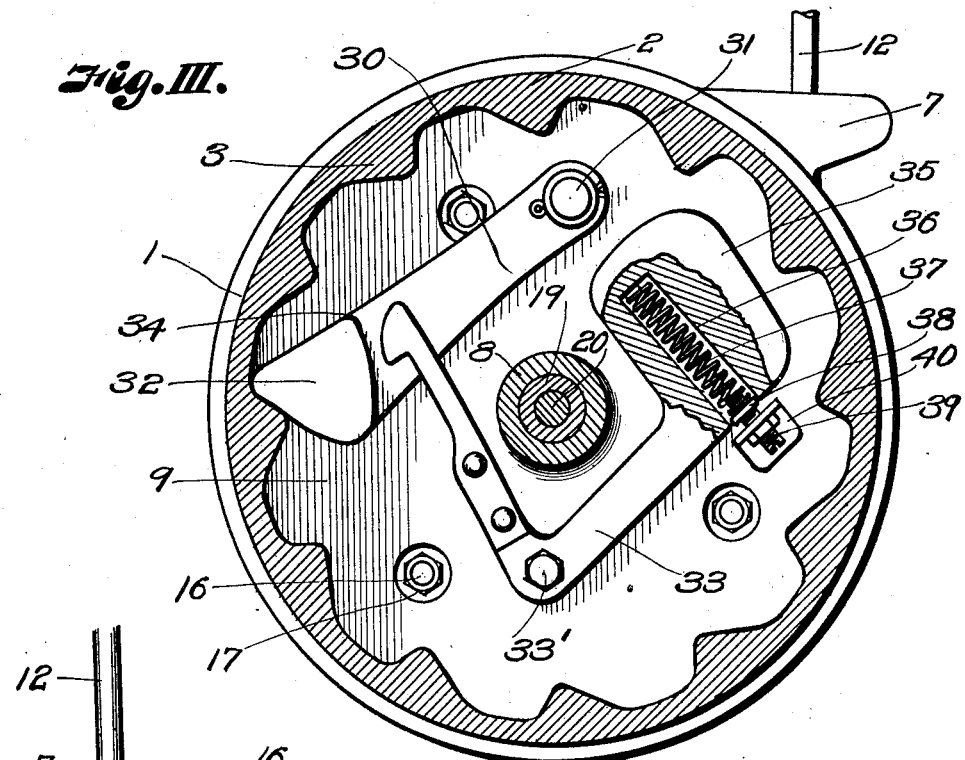
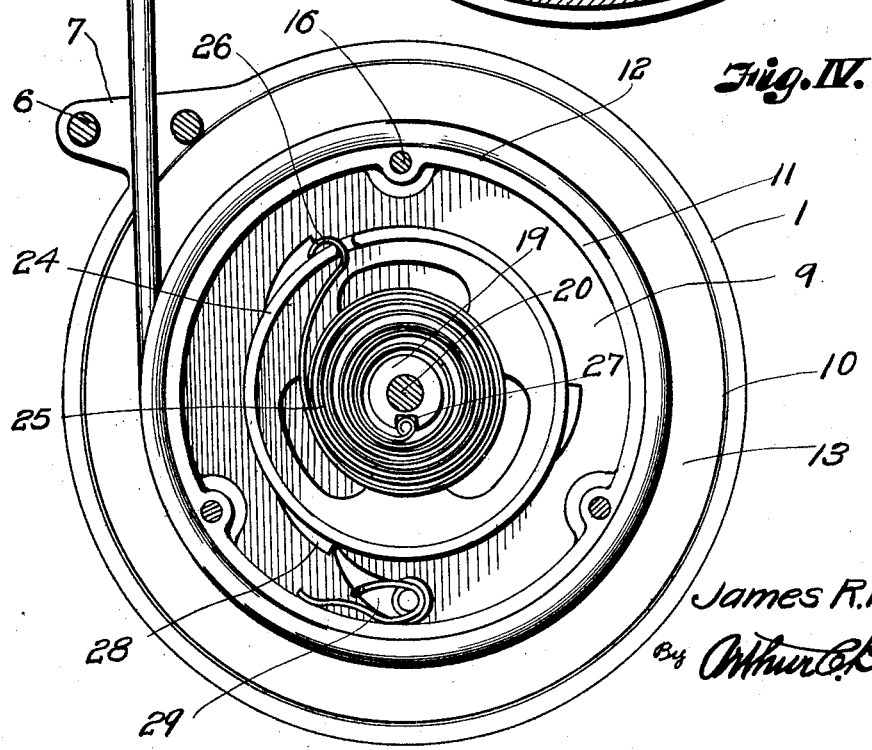

UNITED STATES PATENT OFFICE.

JAMES R. RICKETTS, OF KANSAS CITY, MISSOURI.

TROLLEY-CATCHER.

1,393,570.

Specification of Letters Patent.   Patented Oct. 11, 1921.

Application filed April 30, 1919.   Serial No. 293,750.

*To all whom it may concern:*

Be it known that I, JAMES R. RICKETTS, a citizen of the United States, residing at Kansas City, in the county of Jackson and State of Missouri, have invented certain new and useful Improvements in Trolley-Catchers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to trolley catchers and one of the objects of the invention is to provide a trolley catcher which will be simple in operation, which may be conveniently constructed, inexpensive to manufacture, and of such construction that it may be readily assembled and disassembled for inspection or repairs.

In overhead trolley construction, the wires or conductors through which the current passes, must be positioned by means of guys consisting of wires or cables and in some instances the trolleys are supported on catenary supports. In order to maintain efficient electrical contact the trolley poles extending from the cars are usually provided with strong springs which have a tendency to exert considerable pressure between the trolley wheel and the wire. If the trolley jumps the wire, the springs tend to swing the pole to a vertical position with the upper end thereof considerably higher than the plane in which the guide wires or cables lie. As the car moves, the pole is liable to catch in these wires and tear them from their anchorages.

Heretofore attempts have been made to "catch" the trolley by winding devices which are adapted to wind the trolley cord and locking means have hitherto been provided to prevent unwinding movement of the trolley rope drum. The locking devices, however, have depended wholly on centrifugal force and usually included springs which needed careful and delicate adjustment so that the centrifugal locking devices would fly out into locking position in response to the unwinding speed of the trolley cord drum. These devices have proved unsatisfactory, however, because their operation depended upon a predetermined speed and by the time the speed of the trolley drum permitted the locking device to operate, the trolley pole would be permitted to assume a substantially vertical position; then if the trolley pole happened to be depressed, the winding drum could not recover the trolley rope and hold it quick enough to retain the trolley wheel below the plane of the guy wires. For this reason such trolley catchers have proved unsatisfactory in practice.

I have provided a trolley catcher in which the catchers are so arranged that they will become effective due to inertia rather than to centrifugal force.

My invention contemplates the provision of a primary locking member and a secondary locking member or detent which are so arranged that the primary locking member for engaging a stationary part will remain inactive so long as the trolley pole is operating under normal conditions, the mechanism not being effected by sidewise motion of the car or by any inequalities of the road bed or rails. When, however, the winding drum is subjected to a sudden jerk as when the trolley wheel jumps the trolley wire, an overbalanced weighted detent or secondary member moves away from locking engagement with the primary locking member which engages a rigid part and the pole is permitted to swing upwardly only a short distance. If the car is running at the usual speed, the pole may strike the first guy wire but at such an angle that it will be readily knocked down so that the trolley wheel and end of the pole will be thrown below the guy wires and feed wire. As it starts to swing upwardly again under the action of the trolley pole springs, the released primary member will immediately engage the rigid part and prevent any further upward swing.

In actual practice I have found that a very slight abnormal upward swing of the trolley pole is sufficient to permit the unlocking of the primary and secondary members, this being due to the fact that the weighted end of the detent or secondary member is unsupported except for a relatively weak compensating spring which simply serves to support the overbalanced weighted end of the detent as it travels about the axis of the winding drum, the spring being only strong enough to resist the tendency of the weighted end of the detent to swing out as the members assume positions which might cause them to become accidentally disengaged one from the other. For example, as the primary member and the weighted arm of the secondary member assume perpendicular positions during the rotation of the trolley cord drum, there might be a tendency for the two members to become accidentally unlocked were it not for the fact that the spring in these positions maintains the weight in locking position.

Other objects and advantages of this invention will be apparent as the nature of the case is better understood by reference to the following description and the accompanying drawings, it being understood, however, that changes in form, proportion and minor details of construction may be resorted to without departing from the spirit of the invention or sacrificing any of its advantages.

In the drawings,

Figure I is a perspective view of a rigid member, a rotating member and associated mechanism comprising the trolley catcher.

Fig. II is a vertical longitudinal sectional view through a trolley catcher constructed in accordance with my invention.

Fig. III is a sectional view on the line III—III of Fig. II in the direction indicated by the arrows, and Fig. IV is a sectional view on the line IV—IV of Fig. II.

One embodiment of my invention may consist of a rigid member which I may term the base or anchor and this may consist of a disk 1 provided with a peripheral flange 2 in which are inwardly projecting teeth 3 forming a circular rack, as best seen in Fig. I. The disk 1 is provided with a peripheral flange 4 having notch-engaging projections 5 adapted to engage notches in the usual socket in the end of the car so that the rigid member consisting of the parts 1 to 5, both inclusive, will be held against rotation. The rigid member carries a trolley cord guide 6 which is in the form of a loop supported upon an outstanding arm 7, as best seen in Fig. I.

The rigid member may also support a slack takeup here shown as consisting of a winding drum connected to and supported by the rigid member in a novel manner. By reference to Fig. II it will be observed that the winding drum may consist of a hub 8 provided with a wall or disk 9 the diameter of which is less than that of the flange 2 so it may fit into the offset portion 10 within which it rotates. The disk or flange 9 is provided with an outstanding flange 11 which constitutes the trolley cord drum to support the cord 12, as best seen in Fig. II. The annular rim portion 13 of the disk 9 constitutes one side wall of the drum and cooperates with the extended portion 14 of the removable plate 15 carried by the drum for the purpose of providing a space for the cord 12. The plate 15 is removably secured to the drum by the fastening devices shown as substantially headless bolts 16 which pass through the plate and through the drum and preferably provided with nuts 17 in countersunk recesses in the disk 9, as shown in Fig. II. The plate 15 is provided with a crank 18 by means of which the drum may be turned to wind the cord, as will be presently explained. The hub 8 of the winding drum is journaled upon a bearing which consists of a sleeve 19 supported on the bolt 20, the head 21 of which bears against a washer 22 of the plate 15, the other end of the bolt being secured to the flange 1 by a removable nut 23, here shown as a castle nut, whereby it may be locked to the bolt if desired. The bearing 19 also carries a spring housing 24 which is rotatable thereon and is connected to one end of a coil spring 25 as at 26 (Fig. IV), the other end of the spring being swingingly connected to the bearing 19 at 27. The spring housing 24 is provided at its periphery with shoulders or lugs 28 to be engaged by a spring pressed pawl or latch 29 pivotally secured to the winding drum 11, the purpose of which will be explained hereinafter.

On the disk 9 of the rotating drum is a locking mechanism adapted to stop the rotation of the trolley cord winding drum under abnormal conditions. This locking mechanism consists of a primary locking device and a secondary locking device, the first being adapted to engage the circular rack 3 on the rigid part 1 and the secondary locking device being effective in normally retaining the primary locking device out of locking position. By reference to Fig. III it will be observed that the primary locking device consists of a centrifugally actuated pawl or dog 30 pivotally connected to the disk 9 by a boss 31 projecting therefrom, the free end of the dog or pawl 30 having a weighted head 32 adapted to engage with the notches or teeth 3 in the circular rack carried by the rigid member 1. Carried by the disk 9 and spaced from the dog 30 is an elbow lever 33 pivoted at 33′ to the disk 9 and having a detent or dog adapted to engage the headed portion of the link, as at 34. On the other end of the elbow lever 33 is a weight 35 having a recess 36 to receive a spring 37, one end of which bears against a collar 38 on the adjustable screw 39 carried by the bracket 40 whereby the tension of the spring can be varied to suit the increment of force at which it is desired the inertia shall be effective in releasing the latch or primary member 30, it being understood that for the purpose of this specification, the elbow lever constitutes the secondary locking device.

Assuming all of the parts to be assembled and the rigid member is fastened to the car with the trolley rope or cord wound upon the drum 11, the operation may be described as follows:

An upward movement of the trolley wheel will cause the cord to unwind and the spring 25 to wind due to the fact that the unwinding action of the trolley cord drum will cause the dog 29 to throw out to engage or pick up one of the projections 28 and thereby wind the spring and the connection between the pawl 29 and the projection 28 will lock the drums 11 and 24 together. This will be apparent by reference to Fig. IV. It will be observed that the spring 25 has one end connected to the drum 24 and the other end to the rigid bearing sleeve 19.

In the event that there is slack in the trolley cord 12, the tendency of the spring 25 to unwind will cause the end of the projection 28 to exert pressure against the toe of the pawl 29 on the drum 11 and thereby impart a winding action to the drum. If the winding action of the drum 11 is prolonged as, for example, in case of the trolley rope breaks, there would be a tendency for the spring to unwind to such an extent that it might overrun and thereby cause its anchored end to become broken. The construction is such, however, that when the spring has expanded to its maximum, the drum 11 may continue to rotate in a winding position without further unwinding movement of the drum 24 and the spring 25 because the pawl 29 may ride idly over the cam surfaces of the stops or projections 28, as will be apparent by reference to Fig. IV.

When the primary member is released from the stationary part, it will automatically move into locked position, riding over the detent head 34, the weighted end 32 being sufficient to overcome the resistance of the spring 37 and as soon as the head has moved into locking position, the expansive force of the spring 37 will be sufficient to maintain the parts locked whenever the primary member and arm 33 are in substantially vertical planes. At other times the weight 35 will perform this function.

It will be seen from the foregoing that the device operates in response to inertia and not to centrifugal force because with the construction constituting the embodiment of my invention, the moving out of the weight to release the detent from the primary locking member is not gradual and is not dependent upon speed but operates in response to sudden variations in acceleration of rotative movement of the winding drum. That is to say, the winding drum 11 may wind and unwind at considerable speed under normal conditions provided the winding and unwinding is not subjected to sharp, sudden variations in accelerations. When there is a sharp, sudden change in acceleration as, for example, when the trolley pole jumps the feed wire, the detent is stripped to release the primary locking member.

By reference to Fig. II it will be observed that the various elements of the device are so constructed that the trolley catcher may be readily assembled or taken apart for repairs. For example, in order to remove the essential parts, it will be only necessary to detach the entire device from the support, remove the castle nut 23 from the bolt 20 whereupon the washer 22 will also come off, then the drum 11, flange 13 and plate 15 may be removed with the bearing 19, whereupon inspection may be had of the retarding mechanism consisting of the primary and secondary locking devices 30 and 33. If it is desired to examine the interior of the drum 11, the nut 17 may be removed from the bolts 16 whereupon the plate 15 may be removed and the interior of the drum inspected.

When the sleeve 19 is in place, its recess 41 will engage the projecting finger 42 on the disk 1 so that liability of the bearing sleeve 19 rotating will be eliminated.

By reference to the foregoing description, it will be understood that, under normal conditions, the members 30 and 33 will remain locked together. When, however, the trolley wheel jumps the wire, a sudden acceleration or jerk will be imparted rotatively to the drum and since the members 30 and 33 are pivotally carried by the drum, the inertia of the weight 35 will cause the member 33 to pivot on the drum so that the detent head 34 will release the end 32 of member 30, permitting the end 32 to move into one of the notches in rack 3 and thereby stop further rotation of the drum, it being understood that the spring 37 is to be only strong enough to maintain the parts 30 and 33 locked until the weight inertia overcomes the spring 37.

From the foregoing description, it is believed that the construction and operation of the device will be apparent and that it will be observed that the same may be inexpensively constructed, will be efficient in operation and well adapted for the purpose intended.

What I claim and desire to secure by Letters-Patent is:

1. In a trolley catcher, the combination with a drum and a trolley rope secured thereto, of a freely movable pawl on the drum, a detent normally holding the pawl against movement, and a rigid member to be engaged by the pawl, said pawl moving into locked engagement with the detent by its own weight when released from the rigid member.

2. In a trolley catcher, the combination with a drum and a trolley rope secured thereto, and a rack about the drum, of a freely swinging rack-engaging pawl on the drum, a weighted detent normally holding the pawl out of engagement with the rack, means responsive to acceleration of the weighted part of the detent to release the detent to permit it to freely swing into engagement with the rack, and a weight on the pawl to assist in causing the pawl to swing into engagement with the detent when released from engagement by the rack.

3. In a trolley catcher, the combination with a drum and a trolley rope secured thereto, of locking means on the drum comprising a pivoted primary member having a weighted free end, a detent having movement independent of the locking means normally engaging the primary member and having weight-actuated means responsive to inertia to move it out of engagement with the primary means, and a rigid circular rack for engagement by the primary member.

4. In a trolley catcher, the combination with a drum and a trolley rope secured thereto, of a locking means for the drum comprising a pivoted primary member mounted for free swinging movement and having a weight at its free end, a secondary member provided with a detent for normally engaging the primary member, and an overbalance weight for actuating the secondary member entirely out of engagement with the primary member.

5. In a trolley catcher, the combination with a drum and a trolley rope secured thereto, of means for locking the drum against unwinding movement comprising a pivoted primary member having a weighted free end, a secondary member including a detent for normally engaging the primary member, said secondary member having an overbalance weight for actuating the detent, and a spring normally overbalancing the weight.

6. In a trolley catcher, the combination with a drum and a trolley rope secured thereto, a locking mechanism for the drum comprising a primary member consisting of a link pivoted to the drum and having a weighted free end, a stationary rack to be engaged by the weighted end of the primary member, a secondary member carried by the drum consisting of an elbow lever, one arm of which is provided with a detent for normally engaging the primary member, a weight on the other arm of the lever, and a spring carried by the drum and the weight, the overbalancing spring having an expansive force equal to that exerted by the weight.

7. In a trolley catcher, the combination with a drum and a trolley cord secured thereto, a pivoted dog carried by the drum, a rigid circular rack adapted to be engaged by the dog, and means for normally holding the dog out of locking position comprising an elbow lever movable with the drum, the two arms of which form an acute angle, a detent on the outer edge of one of the arms, a weight on the inner edge of the other arm, and a spring normally opposing movement of the weight.

8. In a trolley catcher, the combination with a drum and a trolley cord connected thereto, a spring-actuated drum, and means between the spring-actuated drum and the trolley cord drum for causing a winding action to be imparted to the trolley cord drum when the spring unwinds and vice versa, said means being effective in permitting the trolley cord drum to overrun the spring-actuated drum.

9. In a trolley cord catcher, the combination with a rigid member provided with a flange having rack teeth therein, a bearing member connected to said rigid member, a trolley cord drum rotatable about the bearing and provided with a primary member and a secondary member, normally locked together and releasable by overbalanced weight-actuated inertia to permit the primary member to engage the rack, a spring-actuated drum on the bearing member, the spring of which has unwinding action when the winding drum has winding action and vice versa, a projection on the spring-actuated drum, and spring-actuated dogs on the trolley rope drum to engage the projections on the spring-actuated drum, said dogs being effective in permitting the trolley rope drum to overrun the spring-actuated drum in one direction.

10. In a trolley catcher, a rigid member having a circular rack, a trolley rope drum rotatable about the axis of the rigid member and having locking means for engagement with the rack, a spring-actuated drum within the trolley rope drum and having peripheral projections, and a spring-actuated dog carried by the trolley rope drum for engagement with the projections on the spring-actuated drum when both drums are traveling in the same direction but permitting the trolley rope drum to overrun the spring-actuated drum when the trolley rope drum is operating at a different speed from that of the spring-actuated drum and in an opposite direction.

11. In a trolley catcher, the combination with a drum and a trolley rope secured thereto, of a rigid member adapted to be secured to the car, a bolt projecting from the rigid member, a bearing sleeved upon the bolt and removably engaging the rigid member, said bearing forming a support for the drum, and a spring-actuated drum mounted upon the bearing and adapted to impart motion to the rope drum.

12. In a trolley catcher, the combination of a drum, of a rigid member adapted to engage a car, a bolt removably engaging the rigid member, a sleeved bearing upon the bolt and removably engaging the rigid member, and a washer between the head of the bolt and the end of the bearing.

In testimony whereof I affix my signature.

JAMES R. RICKETTS.